United States Patent [19]

Izaki et al.

[11] 4,306,690
[45] Dec. 22, 1981

[54] MAGNETIC TAPE CARRIER

[75] Inventors: Masataka Izaki, Kadoma; Takenori Akamine, Nara; Isao Kozu, Katano, all of Japan

[73] Assignee: Matsushita Electric Industrial Co., Ltd., Osaka, Japan

[21] Appl. No.: 77,368

[22] Filed: Sep. 20, 1979

[30] Foreign Application Priority Data

Sep. 22, 1978 [JP] Japan .................................. 53-117291

[51] Int. Cl.³ .................... B65H 75/24; G11B 23/10; B65D 85/67
[52] U.S. Cl. ................................ 242/200; 206/387; 360/132
[58] Field of Search ............... 206/387, 527; 242/199, 242/200; 360/132

[56] References Cited

U.S. PATENT DOCUMENTS

| 3,111,282 | 11/1963 | Proctor | 242/200 |
| 3,526,371 | 9/1970 | Blackie et al. | 242/200 |
| 3,689,007 | 9/1972 | Kihara et al. | 242/199 |
| 4,159,769 | 7/1979 | Hatten et al. | 206/527 |
| 4,175,719 | 11/1979 | Speckman et al. | 242/199 |

Primary Examiner—William T. Dixson, Jr.
Attorney, Agent, or Firm—Wenderoth, Lind & Ponack

[57] ABSTRACT

A magnetic tape carrier has a supply reel and a take-up reel on which a magnetic tape is wound, a tape guide for guiding the tape from the supply reel to the take-up reel, a first reel mount on which the supply reel is rotatably mounted, a second reel mount on which the take-up reel is rotatably mounted, and a holder for movably supporting the first mount and second mount. The magnetic carrier can thus be used for various magnetic tape apparatus having different distances between the reel drive shafts of the supply reel and the take-up reel.

8 Claims, 6 Drawing Figures

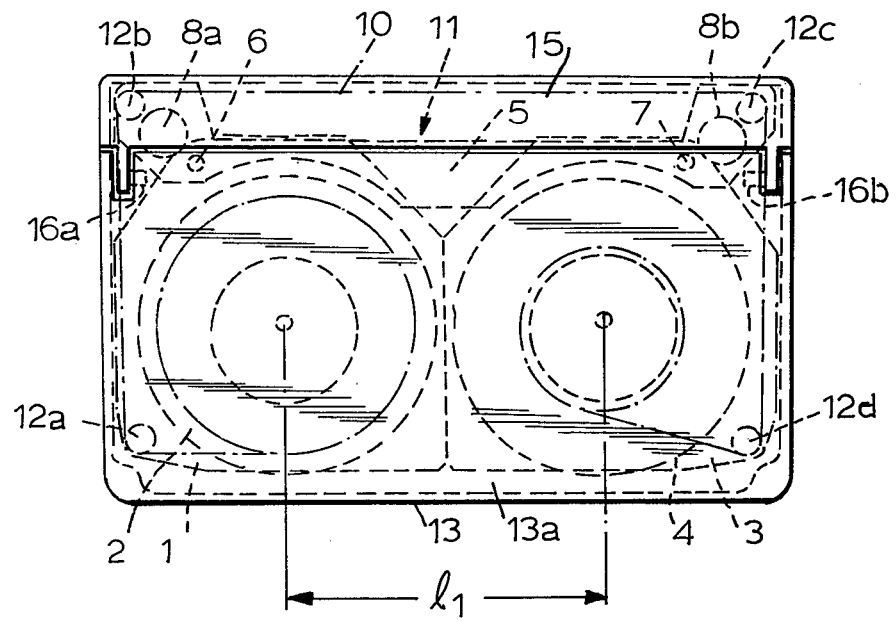
FIG.3
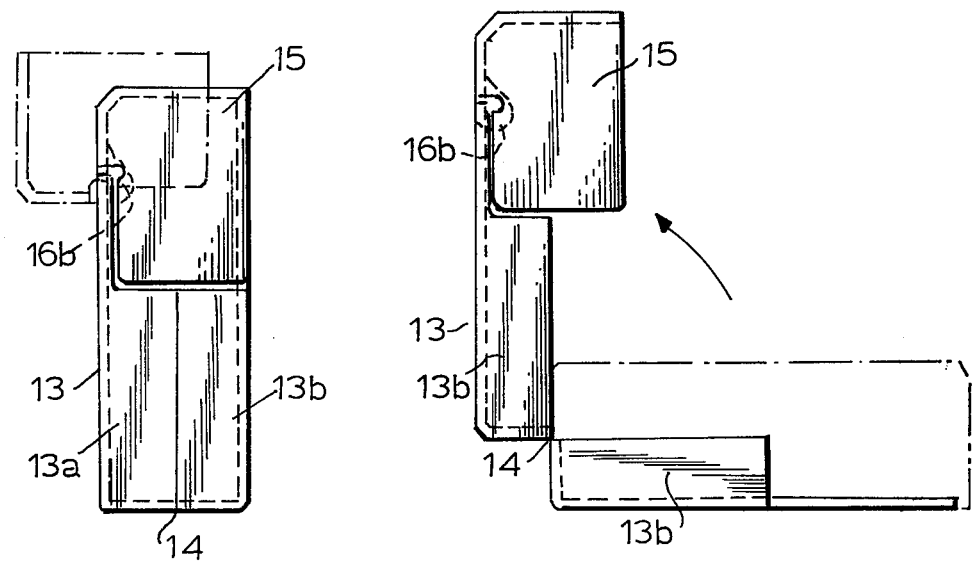
FIG.4 FIG.5

MAGNETIC TAPE CARRIER

This invention relates to a tape cassette, and more particularly to a magnetic tape carrier which is useful for a magnetic tape recording and/or reproducing apparatus such as an audio tape recorder and a video tape recorder.

It is known that there is a large size magnetic tape apparatus which is adapted to employ a large tape cassette carrying a long tape for long recording and reproducing, and there is also a small size magnetic tape apparatus which is adapted to employ a small tape cassette carrying a short tape useful e.g. for out-door recording because of its small size and light weight. These apparatuses may be used selectively depending on needs or purposes.

However, there are differences in the size of components and arrangement of these magnetic tape apparatuses as e.g. to the center distance between a pair of reel drive shafts. Since the center distance between a pair of reels in the tape cassette may be different according to the size of the magnetic tape apparatus, it is quite difficult to keep compatibility between these apparatuses.

It is therefore an object of the present invention to provide a tape cassette which can be used for not only a small magnetic tape apparatus but also a large magnetic tape apparatus.

Another object of the present invention is to provide a cassette construction which is simple to operate and inexpensive to manufacture.

Still another object of the present invention is to provide a unique magnetic tape carrier which can be installed precisely in not only a small cassette shell but a large cassette shell.

These objects are achieved by providing a magnetic tape carrier according to the present invention which comprises a supply reel and a take-up reel, tape guiding means for guiding a tape from said supply reel to said take-up reel, first mounting means for mounting said supply reel rotatably, second mounting means for rotatably mounting said take-up reel, and a holder for movably supporting said first mounting means and said second mounting means.

Further objects and advantages will become apparent from the following detailed description considered in connection with the accompanying drawings, in which:

FIG. 3 is a top plan view of a first cassette shell carrying the magnetic tape carrier;

FIG. 4 is a right side view of the first cassette shell in FIG. 3;

FIG. 5 is a side view of the first cassette shell in the open condition; and

Figure 1:
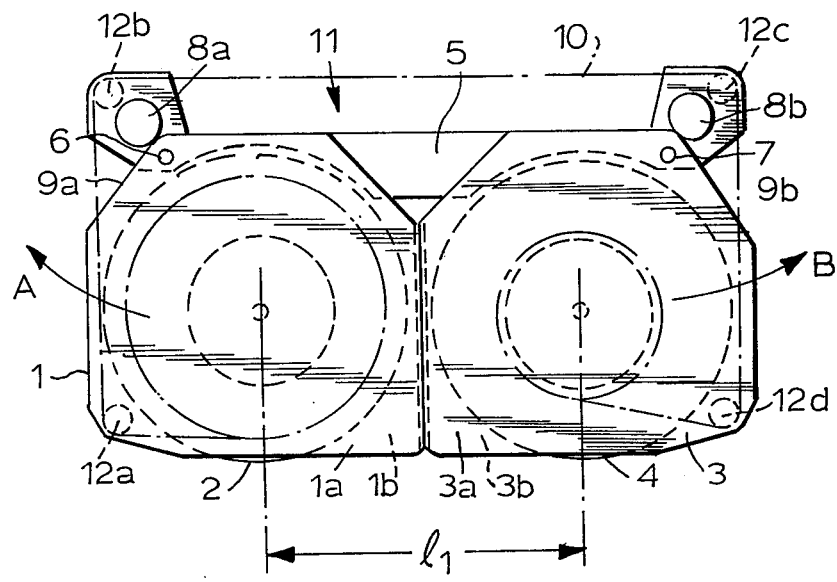
FIG. 1 is a top plan view of a magnetic tape carrier according to present invention.

Referring now to the drawings, there will be explained one embodiment of a magnetic tape carrier according to the present invention.

Figure 2:
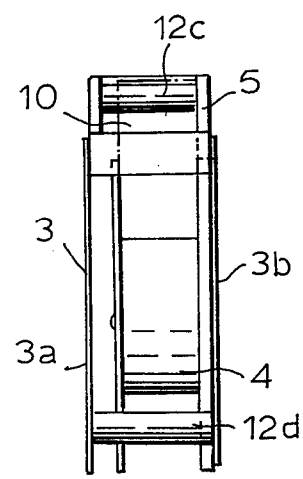
FIG. 2 is a right side view of the magnetic tape carrier in FIG. 1.

As shown in FIG. 1 and FIG. 2, a first mounting means 1 comprises an upper wall 1a and a lower wall 1b which form a hollow casing and have a supply reel 2 rotatably mounted therebetween. A second mounting means 3 comprises an upper wall 3a and a lower wall 3b which form a hollow casing and have a take-up reel 4 rotatably mounted therebetween. The lower walls 1b and 3b are provided with generally circular apertures (not shown) respectively which afford access to the supply reel 2 and the take-up reel 4 for reel drive spindles of a magnetic tape apparatus which will be explained later. The first mounting means 1 and the second mounting means 3 have the same but symmetrical outward appearance and dimensions, and are symmetrically rotatably mounted on shafts 6 and 7 at both ends of a holder 5.

As shown in FIG. 1, the first mounting means 1 and the second mounting means 3 are adapted to contact each other at each of the opposed side walls thereof at the middle between the shafts 6 and 7, and consequently, the center distance between the supply reel 2 and the take-up reel 4 will become a minimum value $l_1$. The first mounting means 1 can be rotated in the direction of the arrow A about the shaft 6 and the second mounting means 3 can be rotated to the direction of the arrow B about the shaft 7 so as to make the center distance between the supply reel 2 and the take-up reel 4 longer than $l_1$.

The holder 5 has a pair of positioning holes 8a and 8b formed at both ends thereof in which a pair of positioning pins of a cassette shell (described later) can be inserted. The first mounting means 1 and the second mounting means 3 have inclined faces 9a and 9b formed in the vicinity of the positioning holes 8a and 8b. The amounts of rotations of the first mounting means 1 and the second mounting means 3 are limited by the abutment of the inclined faces 9a and 9b with the positioning pins when the magnetic tape carrier is installed in a large cassette shell which will be explained later. The holder 5 has a cut away portion 11 formed at a front portion of the magnetic tape carrier through which a magnetic tape 10 is exposed outwards. Tape guiding pins 12a, 12b, 12c and 12d are provided on the first mounting means 1, the two ends of the holder 5, and the second mounting means 3, respectively, so as to direct and guide the magnetic tape 10 from the supply reel 2 to the take-up reel 4 through said cut-away portion 11 of the holder 5.

As shown in FIG. 3, when the center distance between the supply reel 2 and the take-up reel 4 is $l_1$, the magnetic tape carrier can be installed into a first (small) cassette shell 13 adapted to be used for a small magnetic tape apparatus. The first cassette shell 13 is formed as a rectangular, hollow casing which comprises an upper shell 13a and a lower shell 13b made of plastic, such as polypropylene, and can be swingably open about a thin hinge portion 14 interconnecting said upper shell 13a and said lower shell 13b at the rear portion thereof as shown in FIG. 5. A covering means 15 is pivotally mounted on shafts 16a and 16b fixed to a front portion of the upper shell 13a.

When the upper shell 13a and the lower shell 13b are swung into the open state as shown in FIG. 5, the magnetic tape carrier can be installed into the first cassette shell 13, so that its front portion is located at a position opposing the covering means 15, and said mounting means 1 and 3 make contact with each of opposed side walls thereof to keep the center distance between reels 2 and 4 at $l_1$. After installation of the magnetic tape carrier, the upper shell 13a and the lower shell 13b can be closed and connected in any suitable manner, preferably by connecting means such as screws (not shown) or the like.

For more precise positioning of the magnetic tape carrier, it is quite effective to provide a pair of positioning pins (not shown) which are protrusively formed from the lower shell 13a and can be inserted into the positioning holes 8a and 8b provided at the holder 5 of the magnetic tape carrier.

When the covering means 15 is open as shown in dot-dash lines in FIG. 4, the magnetic tape 10 is exposed outwards at the position of the cut-away portion 11 of the magnetic tape carrier, and can be drawn out by suitable pull-out pins (not shown) of the magnetic tape apparatus.

The lower shell 13b is provided with a pair of generally circular apertures (not shown) which afford access to the supply reel 2 and the take-up reel 4 for the reel drive spindles of the small magnetic tape apparatus.

After the magnetic tape carrier is installed into the first cassette shell 13, the first cassette shell 13 can be set on the small magnetic tape apparatus in which the center distance between a pair of reel drive shafts (or a pair of reel rollers) is $l_1$.

Figure 6:
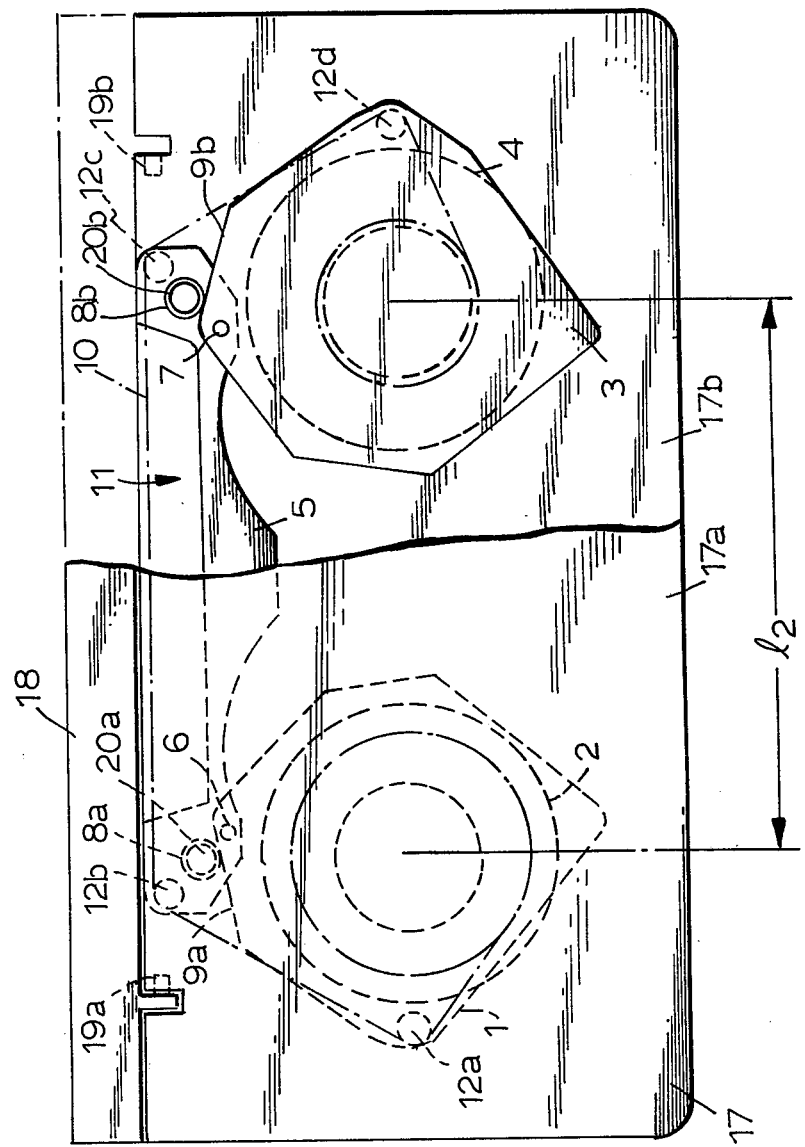
FIG. 6 is a plan view, partially cut away, of a second cassette shell carrying the magnetic tape carrier.

As shown in FIG. 6, a second (large) cassette shell 17 comprises an upper shell 17a, a lower shell 17b and a covering means 18. The upper shell 17a and the lower shell 17b can be opened swingably just like the first cassette shell 13, and the covering means 18 is pivotally mounted on shafts 19a and 19b fixed to a front portion of the upper shell 17a.

The installing operation of the magnetic tape carrier shown in FIG. 1 into the second cassette shell 17 is as follows. At first, the upper shell 17a and the lower shell 17b should be swung into an open state. Then, the first mounting means 1 should be rotated in the direction of the arrow A about the shaft 6, and the second mounting means 3 should be rotated in the direction of the arrow B about the shaft 7 until the center distance between the supply reel 2 and the take-up reel 4 becomes $l_2$ or approximately $l_2$ which is larger than $l_1$. The magnetic tape carrier in such state can be installed into the second cassette shell 17 so as to position the cut-away portion 11 of the holder 5 to oppose the covering means 18.

The lower shell 17b are provided with a pair of positioning pins 20a and 20b which can be inserted in the positioning holes 8a and 8b of the holder 5. When the magnetic tape carrier is installed into the second cassette shell 13 so as to insert positioning pins 20a and 20b into the positioning holes 8a and 8b, the holder 5 can be fixed at a predetermined precise position. The rotation of the first mounting means 1 and the second mounting means 3 is limited by the abutment of the inclined faces 9a and 9b and the positioning pins 20a and 20b, and the center distance between the supply reel 2 and the take-up reel 4 can be maintained at the amount $l_2$.

After installation of the magnetic tape carrier, the upper shell 17a and lower shell 17b of the second cassette shell 17 can be closed and connected in any suitable manner, preferably by connecting means such as screws or the like. Now, the second cassette shell 17 can be applied to the large magnetic tape apparatus in which the center distance between a pair of reel drive shafts is $l_2$.

The lower shell 17b is provided with a pair of generally circular apertures (not shown) which afford access to the supply reel 2 and the take-up reel 4 for the reel drive shafts of the large magnetic tape apparatus.

It is apparent that various modification may be made without departing from the substantial properties of the present invention. The above described specific example is intended merely to illustrate the various facets in a certain selective embodiment of the invention, the scope of which it is intended shall be limited only by the following claims.

We claim:

1. A magnetic tape carrier comprising:
    a supply reel and a take-up reel on which a magnetic tape is wound;
    a tape guiding means for guiding the tape from said supply reel to said take-up reel;
    first mounting means on which said supply reel is rotatably mounted;
    second mounting means on which said take-up reel is rotatably mounted; and
    a holder on which said first mounting means and said second mounting means are movably mounted for movement independently of each other between positions in which the reels are fixedly positioned close to each other at a center distance between said two reels of $l_1$ and positions in which the reels are fixedly positioned relatively far from each other at a center distance between said two reels of $l_2$ which is larger than $l_1$.

2. A magnetic tape carrier according to claim 1 in which said first mounting means and said second mounting means are hollow casings, each of which is adapted to have a corresponding one of said two reels rotatably mounted therein and which is pivotally supported on said holder for pivotal movement independently of the other hollow casing.

3. A magnetic tape carrier according to claim 2, wherein said holder is provided with a positioning hole for positioning said tape carrier at a predetermined position.

4. A magnetic tape carrier according to claim 2 in which said first mounting means and said second mounting means have opposed side walls contacting each other when the mounting means are in the position where the center distance between said two reels is $l_1$.

5. A magnetic tape carrier according to claim 4, wherein said holder is provided with a positioning hole for positioning said tape carrier at a predetermined position.

6. A magnetic tape carrier according to claim 1, wherein said holder is provided with a positioning hole for positioning said tape carrier at a predetermined position.

7. In combination:
    a cassette casing;
    a magnetic tape carrier in said casing and comprising:
    a supply reel and a take-up reel on which a magnetic tape is wound;
    a tape guiding means for guiding the tape from said supply reel to said take-up reel;
    first mounting means on which said supply reel is rotatably mounted;
    second mounting means on which said take-up reel is rotatably mounted; and
    a holder on which said first mounting means and said second mounting means are movably mounted for movement independently of each other between first positions in which the reels are fixedly positioned close to each other at a center distance between said two reels of $l_1$ and second positions in which the reels are fixedly positioned relative far from each other at a center distance between said two reels of $l_2$ which is larger than $l_1$, said holders being in said first positions; and means in said cassette casing positioning said holders in said first positions.

8. In combination:

a cassette casing;

a magnetic tape carrier in said casing and comprising:

a supply reel and a take-up reel on which a magnetic tape is wound;

a tape guiding means for guiding the tape from said supply reel to said take-up reel;

first mounting means on which said supply reel is rotatably mounted;

second mounting means on which said take-up reel is rotatably mounted; and a holder on which said first mounting means and said second mounting means are movably mounted for movement independently of each other between first positions in which the reels are fixedly positioned close to each other at a center distance between said two reels of $l_1$ and second positions in which the reels are fixedy positioned relatively far from each other at a center distance between said two reels of $l_2$ which is larger than $l_1$, said holders being in said second positions; and means in said cassette casing positioning said holders in said second positions.

* * * * *